Dec. 8, 1970  R. N. ZITTER  3,546,628
OSCILLATING METAL OBJECT DETECTOR
Filed June 20, 1968
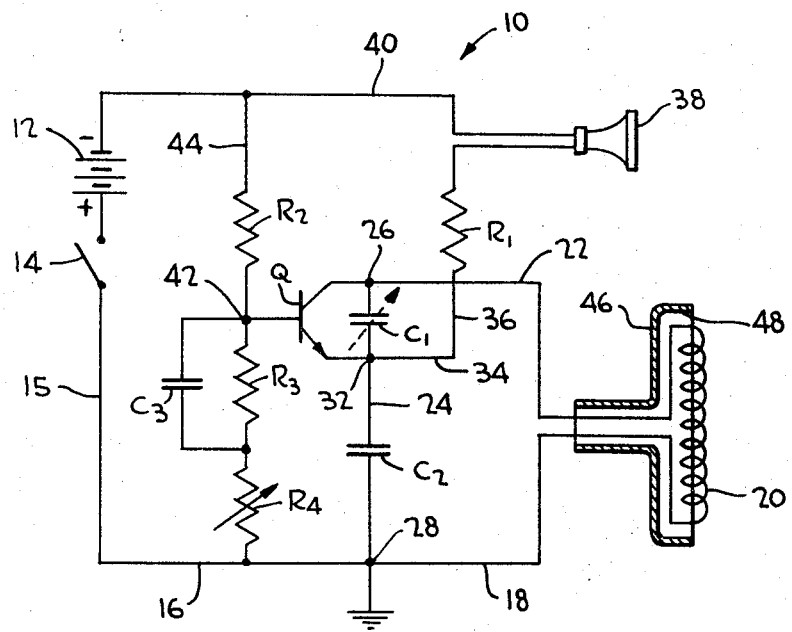

United States Patent Office 3,546,628
Patented Dec. 8, 1970

3,546,628
OSCILLATING METAL OBJECT DETECTOR
Robert N. Zitter, Box 450, Rte. 1, Lakeshore Drive,
Carterville, Ill. 62918
Filed June 20, 1968, Ser. No. 738,476
Int. Cl. G01v 3/12
U.S. Cl. 331—117                                    3 Claims

ABSTRACT OF THE DISCLOSURE

The invention relates to an oscillator circuit for use as a metal object detector and includes a tank circuit normally oscillating above the audible range and a feedback circuit normally oscillating in resonance with the tank circuit. The feedback oscillations are quenched at an audible rate or frequency in such a manner that the quenching frequency will be dependent upon a variation in either the frequency or amplitude of the inaudible oscillations of the tank circuit. Upon the presence of a metal object in the magnetic field of the tank circuit, the tank circuit becomes detuned and oscillates with a different frequency and amplitude, thereby changing the audible frequency of the quenching rate. The output of an earphone, connected in the feedback loop, indicates to a user of the invention through a change in pitch the presence of the metal object in the magnetic field of the tank circuit.

The present invention relates to an oscillator circuit for use as a metal object detector, and more particularly, to an oscillating metal object detector having a normal oscillating frequency above the audible range and a superimposed, self-quenched frequency in the audible range.

According to the invention, a power source supplies a tank circuit comprising an inductance coil connected in parallel with a pair of capacitors in series. The tank circuit normally oscillates above the audible range. The oscillations thereof are amplified through a feedback circuit which includes a transistor, connected with its collector and emitter across one of the capacitors, and an earpiece, for audibly indicating the presence of a metal object, in a manner to be hereinafter described. The transistor normally oscillates in resonance with the oscillations produced by the tank circuit. The periodic charging and discharging of a capacitor in the base portion of the transistor circuit quenches the above-mentioned oscillations at an audible rate. The rate of charge of the capacitor is determined by the frequency and amplitude of the oscillations in the tank circuit. More particularly, when the inductance coil of the tank circuit is utilized as a search coil and is brought in the vicinity of a metal object, the tank circuit becomes detuned and oscillates with a different frequency and amplitude. The oscillations of the transistor in the feedback circuit are then self-quenched at a different audible frequency dependent upon the charging time of the capacitor. The pitch of the quenched oscillations is then produced at the earpiece and is detected by an operator of the device, which pitch is determined by the size and proximity of the metal object in the magnetic field of the inductance coil. The larger or closer the metal object, the lower the pitch in quenched frequency is produced.

Accordingly, it is an object of the present invention to provide an oscillator metal detector wherein a change in pitch of audible oscillations thereof are produced only upon the detection of metal within the magnetic field of a search coil.

A further object of the invention is to provide an oscillating circuit of the self-quenched, super-regenerative type wherein the quenching frequency is in the audible range and the pitch of the quenching frequency is changed by the presence of a metal object in the magnetic field of a search coil.

Another object of the invention is to provide a metal detecting device wherein a search coil is connected in an oscillating circuit and an audible detector is connected in an oscillating feedback circuit coupled to the oscillating circuit.

Still another object of the present invention is to provide an oscillating detector circuit having an oscillating feedback circuit, the current level therein being adjustable by selecting the current bias on an oscillating transistor connected in said feedback circuit.

Other objects and many attendant advantages of the invention will become apparent from the following description taken in conjunction with the accompanying drawing, wherein the figure illustrates an oscillating detector circuit according to the invention.

With reference to the drawing, a circuit suitable for use as an oscillating metal object detector is shown generally at 10 and includes a D.C. power source 12 and a manually operable on-off switch 14, each electrically connected along a conductor 15. The conductor 15 is connected to a conductor 16. A connector 18 connects a low impedance inductance coil 20 of ten turns to the conductor 16. The inductance coil 20 is provided with a conductor 22 which, together with the conductor 18, connects the inductance coil 20 in parallel relationship with a pair of capacitors C1 and C2, which are in series relationship along a conductor 24. The conductor 24 is connected at one end thereof to a junction 26 on the conductor 22 and at the other end thereof, to a junction 28 of the conductors 16 and 18. The inductance coil 20 and the capacitors C1 and C2, together with their associated conductors 18, 22 and 24 comprise an oscillating tank circuit. Said tank circuit is provided with a regenerative collector-emitter feedback circuit which includes a transistor Q connected with its collector to the junction 26 and with its emitter to a junction 32, located on a portion of the conductor 24 between the capacitors C1 and C2. The feedback circuit additionally includes a conductor 34 connecting a conductor 36 with the junction 32. A resistor R1 and an 8-ohm earpiece 38 are electrically connected in series along the conductor 36. Additionally, the conductor 36 is provided with a conductor 40 which connects the feedback loop to the power source 12. The transistor Q, connected in the feedback circuit, acts as an oscillator with a frequency in resonance with the tuned frequency of the above-described tank circuit. The capacitors C1 and C2 act as a voltage divider, the voltage across capacitor C1 being at a lower level than the voltage across the capacitor C2.

Accordingly, the provision of the capacitor C1 maintains at low level the current supplied to the oscillating transistor, and, correspondingly, through the feedback circuit. With reference to the figure, the base of the transistor Q is connected at a junction 42 located on a conductor 44, which is connected between the conductors 16 and 40. The conductor 44 is provided with a resistor R2 on the negative side of the junction 42, and with a resistor R3 and variable resistor R4 on the positive side of the junction 42. The resistor R2 cooperates with the resistors R3 and R4 to provide a voltage divider to provide the base bias voltage for the transistor Q. The resistor R4 is selectively variable to adjust the base bias voltage and, therefore, to regulate the amplification of the oscillations in the collector-emitter feedback circuit. Accordingly, the transistor acts as an electronic valve for adjusting the amplification level of the oscillations produced in the feedback loop. A capacitor C3 is connected in parallel with the resistor R3 and is charged as a result of oscillations in the feedback loop. A voltage, produced as a result of this charge, is impressed on the base of the transistor through the junction 42 and thereby decreases the amplification of oscillations in the collector-emitter feedback circuit to the point where oscillations cease. This is followed by the discharge of the capacitor C3 through the resistor R3, which restores the transistor base voltage to its original value, so that oscillations of the circuit begin again. Then the capacitor C3 is charged and again quenches the oscillations. Accordingly, a periodic charging and discharging of the capacitor C3 is produced which determines the frequency of oscillations in the feedback circuit. Since the capacitors C1 and C2 act as a voltage divider, as above-described, an adjustable capacitor may be substituted for either of these in order to regulate further the amplification level of the oscillations produced in the collector-emitter feedback circuit. Thus, the capacitor C1 is shown in phantom as being adjustable. Additionally, the inductance coil 20 is provided with a shield 46, having an opening 48 for partially exposing the turns of the inductance coil 20. The shield 46 prevents detuning of the tank circuit by interfering phenomena and also prevents the radiation of oscillations from the device which might interfere with nearby radio reception.

In a preferred embodiment of the above-described device, the circuit components thereof may have the following values:

C1=01.001 µfd.
C2=0.1 µfd.
C3=0.02 µfd.
R1=220 Ω.
R2=82K Ω.
R3=1.8K Ω.
R4=2500 Ω variable.

In the operation of the above-described device, a user first closes the switch 14 to permit current flow from the power source 12 and through the following components: the conductor 15, the conductor 16, the conductor 18, the inductance coil 20, the conductor 22, the collector and emitter of the transistor Q, the conductor 34, the conductor 36, the resistor R1, the earpiece 38 and the conductor 40, and back to the negative side of the power source 12. The inductance coil 20, together with its shield 46, is employed as a search coil for detecting the presence of a metal object. The collector-emitter feedback circuit oscillates in resonance with the tank circuit. These oscillations are quenched periodically at a much lower frequency through the periodic charging and discharging of the capacitor C3 in connection with the resistor R3, as described above. With the values of circuit elements selected, as above set forth, the quench frequency is within the audible range of 100 to 15,000 cycles/sec. The quench frequency may be changed by adjusting the value of the variable resistor R4 or the variable capacitor C1. Normally, these are adjusted to give a quench frequency of about 1000 cycles/sec. which is heard by the user through the earpiece 38. When the inductance coil 20 is brought into the vicinity of a metal object, the presence of the metal object in the magnetic field of the inductance coil will detune the tank circuit, thereby changing the frequency and amplitude of oscillations thereof. This, in turn, will lengthen the charging time of the capacitor C3 and therefore alter the audible quench frequency for the oscillations. As a result, the user will hear a change in pitch in the output from the earpiece 38 when a metal object is in the magnetic field of the inductance coil 20. The change in pitch of the quench frequency produced will be determined by either the size or the proximity of the metal object detected. As the inductance coil approaches the location of a metal object, the pitch will become lower as the inductance coil 20 is brought closer to the metal object. Detection of metal objects is most sensitive when the variable resistor R4 or the variable capacitor C1 is adjusted to provide the lowest audible quench frequency at which the device will operate, since then the change in pitch produced by a metal object corresponds to the largest possible percentage change in pitch, and, therefore, is most easily detected by the user.

For any given adjustment of the resistor R4 or the capacitor C1, the location of the inductance coil which produces the lowest pitch detected at the earpiece will be the location of the metal object detected. Additionally, the relative size of the metal object can be estimated, since a large metal object will produce a lower quench frequency than will a smaller metal object, detected at the same distance from the inductance coil 20.

Although a preferred embodiment of the invention has been described, it should be understood that various modifications thereof can be produced, which modifications are within the scope of the description and appended claims, wherein:

What is claimed is:
1. A self-quenching circuit, comprising:
   a tank circuit including a single inductor in parallel with first and second series connected capacitors,
   said second capacitor being connected to reference potential,
   an oscillating circuit including a single transistor connected with its collector and emitter across said first capacitor,
   a feed back circuit oscillating in resonance with said tank circuit and connected between the emitter and reference potential, which feed back circuit includes a first resistor and a D.C. source in series,
   a second resistor connected to the junction of said first resistor and said D.C. source,
   a third resistor in series with said second resistor and connected to reference potential,
   the base of said transistor connected to the junction of said second and third resistors, and
   a third capacitor connected in parallel across at least a portion of said third resistor, said third capacitor being intermittently charged as a result of oscillations produced in said feed back circuit, said third capacitor intermittently discharging through said third resistor, the intermittent charging and discharging of said third capacitor thereby producing self-quenched oscillation.
2. The structure as recited in claim 1, wherein said capacitor connected between the collector and emitter of said transistor is variable to adjust the frequency of the self-quenched oscillations in said feed back circuit.
3. The structure as recited in claim 1, and further including:
   means associated with said transistor for adjusting the frequency of the self-quenched oscillations of said feedback circuit.

References Cited

UNITED STATES PATENTS 2,836,724   5/1958   Kaminow _____ 331—117

FOREIGN PATENTS 1,104,255   11/1955   France _____ 324—3

JOHN KOMINSKI, Primary Examiner

U.S. Cl. X.R.

324—3; 331—65